(12) United States Patent
Fukatsu et al.

(10) Patent No.: US 6,534,761 B2
(45) Date of Patent: Mar. 18, 2003

(54) IMAGE READER WITH A CLOSED-STATE DETECTOR AND IMAGE FORMING APPARATUS USING SAME

(75) Inventors: Masayoshi Fukatsu, Shizuoka (JP); Yasuyoshi Hayakawa, Shizuoka (JP); Tsuyoshi Waragai, Shizuoka (JP); Tomoyuki Araki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/758,276

(22) Filed: Jan. 12, 2001

(65) Prior Publication Data

US 2001/0028030 A1 Oct. 11, 2001

(30) Foreign Application Priority Data

Jan. 14, 2000 (JP) ......................................... 2000-010204

(51) Int. Cl.[7] ................................................. H01J 40/14
(52) U.S. Cl. ................................ 250/222.1; 250/208.1; 250/214 SW; 340/545.6; 358/474
(58) Field of Search ................................ 250/221, 222.1, 250/551, 214 SW, 208.1; 340/545.3, 545.6; 358/488, 497, 494, 474, 471, 75

(56) References Cited

U.S. PATENT DOCUMENTS

| | | | | | |
|---|---|---|---|---|---|
| 4,540,269 A | * | 9/1985 | Nishiyama | ................... | 340/689 |
| 5,142,326 A | * | 8/1992 | Iwata et al. | ................... | 399/46 |
| 5,900,950 A | * | 5/1999 | Hsu | ........................... | 358/497 |
| 5,917,616 A | * | 6/1999 | Chou et al. | ................. | 358/488 |
| 6,122,077 A | | 9/2000 | Kaji | ........................... | 358/448 |
| 6,163,388 A | * | 12/2000 | Lee et al. | ................... | 358/488 |

\* cited by examiner

Primary Examiner—Stephone B. Allen
Assistant Examiner—Eric Spears
(74) Attorney, Agent, or Firm—Fitzpatrick, Cella, Harper & Scinto (57) ABSTRACT

An image reader includes a first image-reader unit, mounted on a body of the image reader, for reading image information of an original document on a first image-reader section, a closing unit which is openably supported on the body of the image reader through a closing device, a second image-reader unit, mounted on the closing unit, for reading image information of an original on a second image-reader section, and a closed-state detector for detecting a closed state of the closing unit. The closed-state detector includes a photoemitter, a photodetector, and a light-blocking unit which blocks a light beam traveling from the photoemitter to the photodetector, by moving in operative association with the opening and closing operation of the closing unit.

1 Claim, 11 Drawing Sheets

IMAGE READER WITH A CLOSED-STATE DETECTOR AND IMAGE FORMING APPARATUS USING SAME

BACKGROUND OF THE INVENTION

1. Field of the Invention

The present invention relates to an image reader, such as a scanner, a copying apparatus, a printer, or a facsimile device, for reading the image of an original document, and to an image forming apparatus having the image reader.

2. Description of the Related Art

In an image forming apparatus having a pivotally openable automatic document feeder and an image reader, a closing cover and a document platen section have magnets respectively attached thereon. The magnets assist a user to close the cover and hold the cover in place with the mutual attraction of the magnets.

One of the cover and a document platen section movably supports the magnet thereof, and when the cover is closed, the movably supported magnet is pressed, thereby turning on and off a limit switch. The opening and closing of the cover is thus detected.

Since a cover mechanism employs a magnet for opening and closing itself, a device, having a component such as a floppy disk that must be kept away from a magnet. The presence of the magnets limits the construction of the apparatus and the layout of the internal components thereof.

The mounting location must be determined considering that the magnets must not be exposed and that the flexibility of the configuration of the magnets is not very large. When the cover is closed, the magnets knock against each other, causing a clicking sound, thereby leading to friction and damage to the cover.

SUMMARY OF THE INVENTION

It is an object of the present invention to provide an image reader having a closed-state detector which reliably detects the closed state of a closing unit that is openably mounted on the image reader, does not cause a clicking sound when closed, and is free from any limitation in the mounting location thereof, and to an image forming apparatus incorporating the image reader.

An image reader includes a first image-reader unit, mounted on a body of the image reader, for reading image information of an original document on a first image-reader section, a closing unit which is openably supported on the body of the image reader through a closing device, a second image-reader unit, mounted on the closing unit, for reading image information of an original on a second image-reader section, and a closed-state detector for detecting a closed state of the closing unit. The closed-state detector includes a photoemitter, a photodetector, a light blocking unit which blocks a light beam traveling from the photoemitter to the photodetector, by moving in operative association with the opening and closing operation of the closing unit.

In accordance with the present invention, the closed state of the closing unit is reliably detected, the mounting location of the closing unit is not limited, and does not cause a clicking sound when the closing unit is closed.

Further objects, features, and advantages of the patent invention will be apparent from the following description of the preferred embodiments with reference to the attached drawings.

DESCRIPTION OF THE PREFERRED EMBODIMENTS

The preferred embodiments of the present invention are now discussed, referring to the drawings. Dimensions, materials, configurations of components described in connection with the embodiments and relative positions thereof are modified as necessary depending on the construction and the operating conditions of an apparatus in which the present invention is implemented. These details are not intended to limit the scope of the present invention.

First Embodiment

Figure 1:
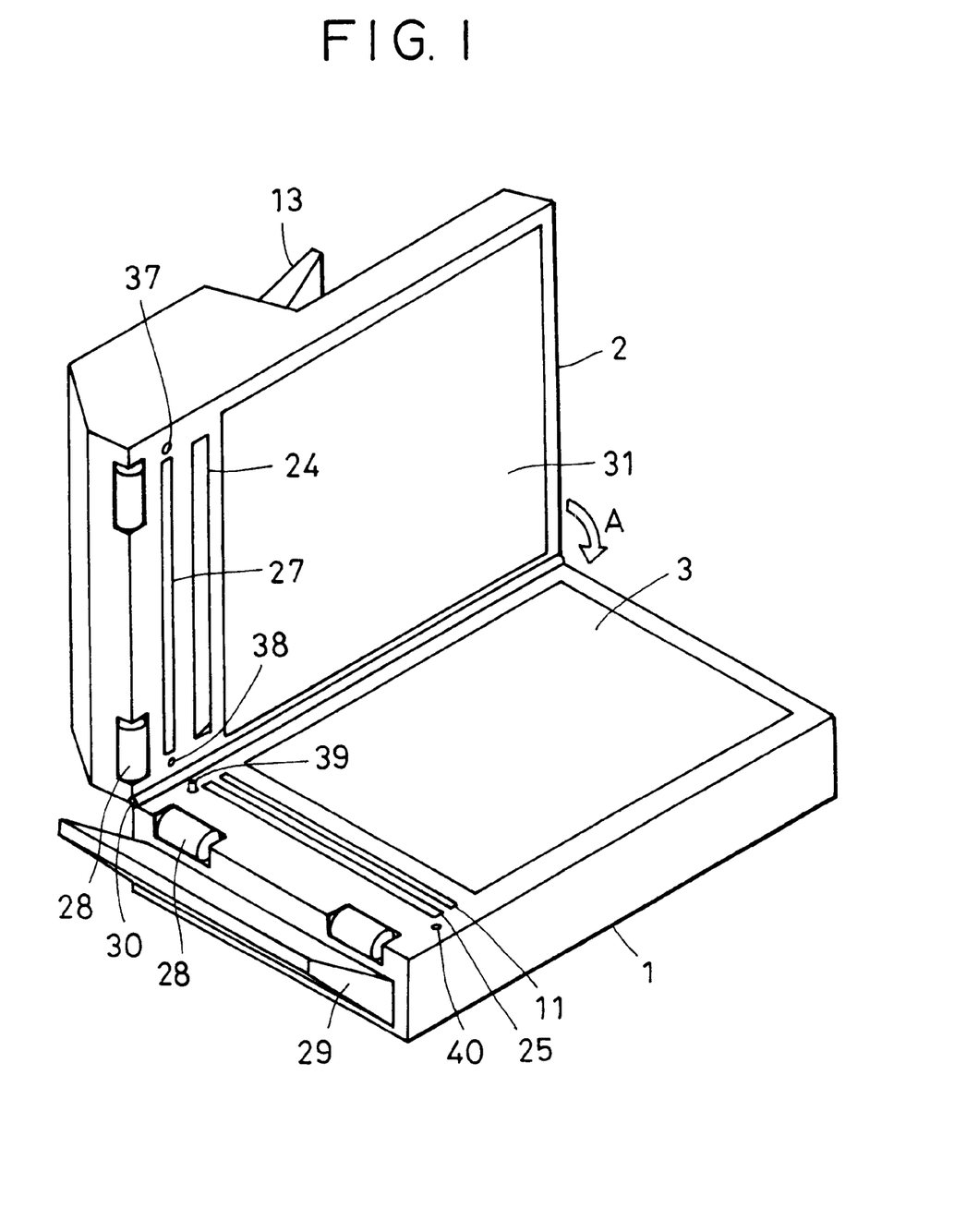
FIG. 1 is a perspective view generally showing an image reader of a first embodiment of the present invention.

FIG. 1 shows an image reader of a first embodiment of the present invention, having a capability of reading both sides of an original document at the same time.

Referring to FIG. 1, there are shown a flat-bed image reader section (FB) 1 that is the device for reading the image of an original document with the original document placed onto a document platen, and an automatic document feeder (ADF) 2 which is a closing unit arranged on the FB 1. The ADF 2 successively feeds stacked original document sheets from document tray 13 to a document reader section page by page.

There are also shown a document glass platen 3 of the FB 1, a document abutment reference plate 11 which is arranged on the document glass platen 3 and which a document sheet abuts in the read position thereof on the document glass platen 3, and a document conveyance upper guide 24 facing the document glass platen 3. When both sides of an original document are read, the original document is allowed to pass through a slit formed by the document glass platen 3 and the document conveyance upper guide 24. The original document then reaches the image reader section where it is read there.

At a first reading point (a first image-reader section) 25, an optical carriage 4 (see FIG. 2) as first image-reader means reads the one side of the image information. At a second image reading point (a second image-reader section) 27, a second carriage 26 (see FIG. 2) as second image-reader means reads the other side of the image information. There are shown document discharge rollers 28 for discharging original documents out of the image reader, and a discharge tray 29, mounted external to the FB 1, for receiving the documents discharged by the document discharge rollers 28.

A hinge 30 (closing means or an axis of rotation) pivotally connects the FB 1 to the ADF 2, and a pressure plate 31 presses the original document onto the document glass platen 3.

Reference numeral 37 identifies a first operative member of a first closed-state detector 40. When the ADF is pivoted in the direction of an arrow A to a closed state, the operative member 37 is put into contact with the closed-state detector 40.

A second closed-state detector 39 has a second operative member 38.

Figure 2:
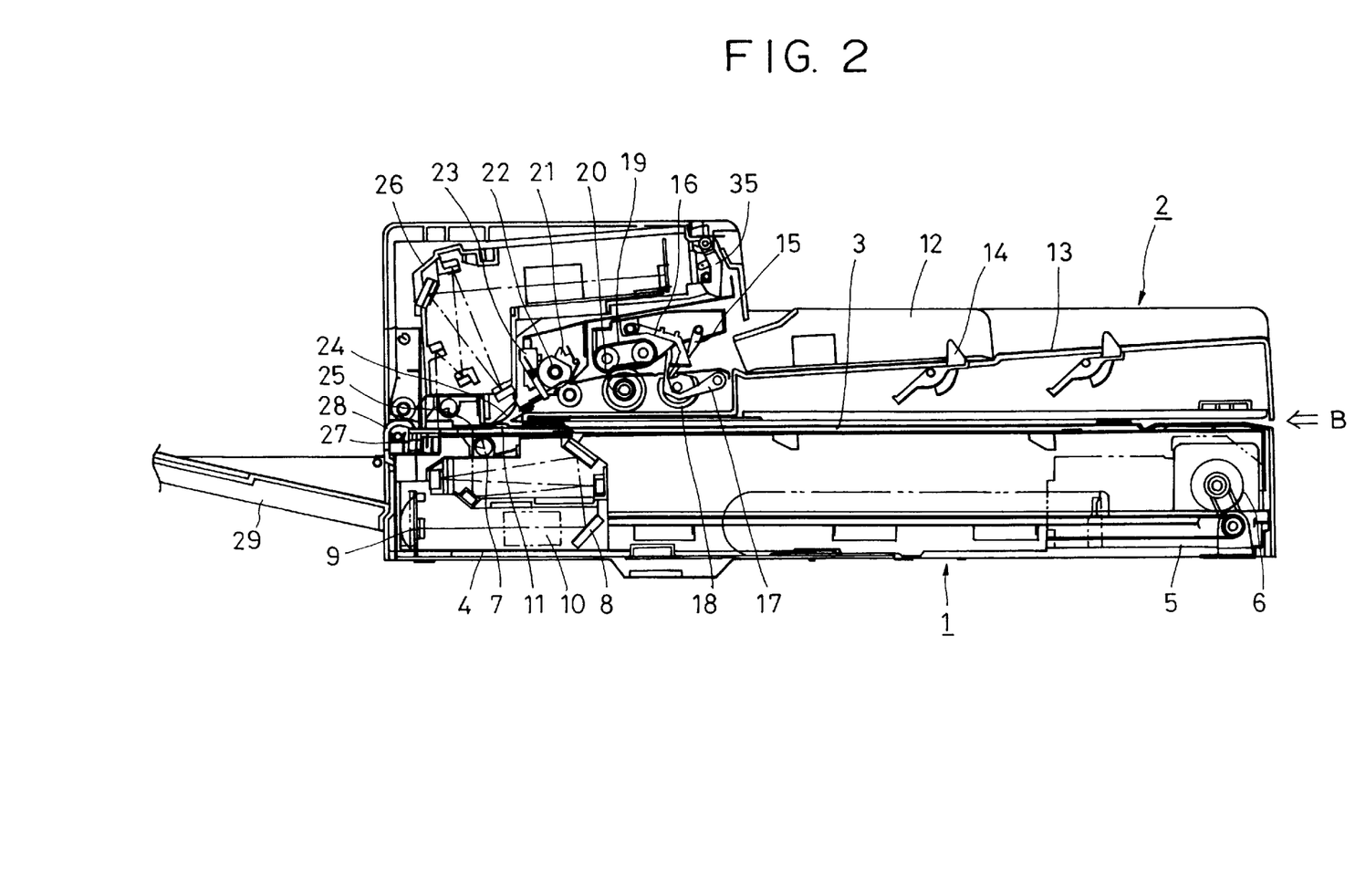
FIG. 2 is a sectional view generally showing the image reader of the first embodiment of the present invention.

FIG. 2 is a sectional view of the image reader of the present invention.

Referring to FIG. 2, there are shown the optical carriage 4 that scans the original document on the document glass platen 3, a drive belt 5 for moving the optical carriage 4, and a carriage drive motor 6 for driving the drive belt 5.

There are also shown a lamp 7 arranged on the top surface of the optical carriage 4, a reflective mirror 8 for guiding a light beam, emitted by the lamp 7 and reflected from the original document, to a predetermined optical path, a CCD 9 for converting the image, obtained from the light beam guided by the reflective mirror 8, into an electrical signal, and a condenser lens 10 for condensing, on the CCD, the light beam reflected from the reflective mirror 8. With this arrangement, the image is read at the first reading point 25.

There are also shown an original document width restraining plate 12 for restraining, in the direction of width, the original document placed in the ADF, a detecting lever 14 for detecting the length of the original document placed in the document tray 13, a document detecting sensor lever 15 which detects the presence or absence of the original document by sensing the leading edge of the original document, a weight 16 for pressing the original document at the leading edge from above, and a document shutter 17 for preventing the leading edge of the document from entering a document separating and feeding section.

The image reader further includes a document pickup roller 18 for feeding the stacked original documents from the bottom one, a separation belt 19 driven in a direction opposite to the direction of document conveyance, a document feed roller 20 arranged to face the separation belt 19, a timing sensor lever 21 for detecting the timing for loop production of the document by detecting the leading edge of the document, a pair of timing rollers 22, and a leading edge detecting lever 23 for detecting the leading edge of the document conveyed by the timing rollers 22.

The second carriage 26 is arranged to face the optical carriage 4 with the document interposed therebetween, and reads the image of the one side of the original document at the second image reading point 27. Like the optical carriage 4, the carriage 26 contains reflective mirrors and a CCD.

Figure 3:
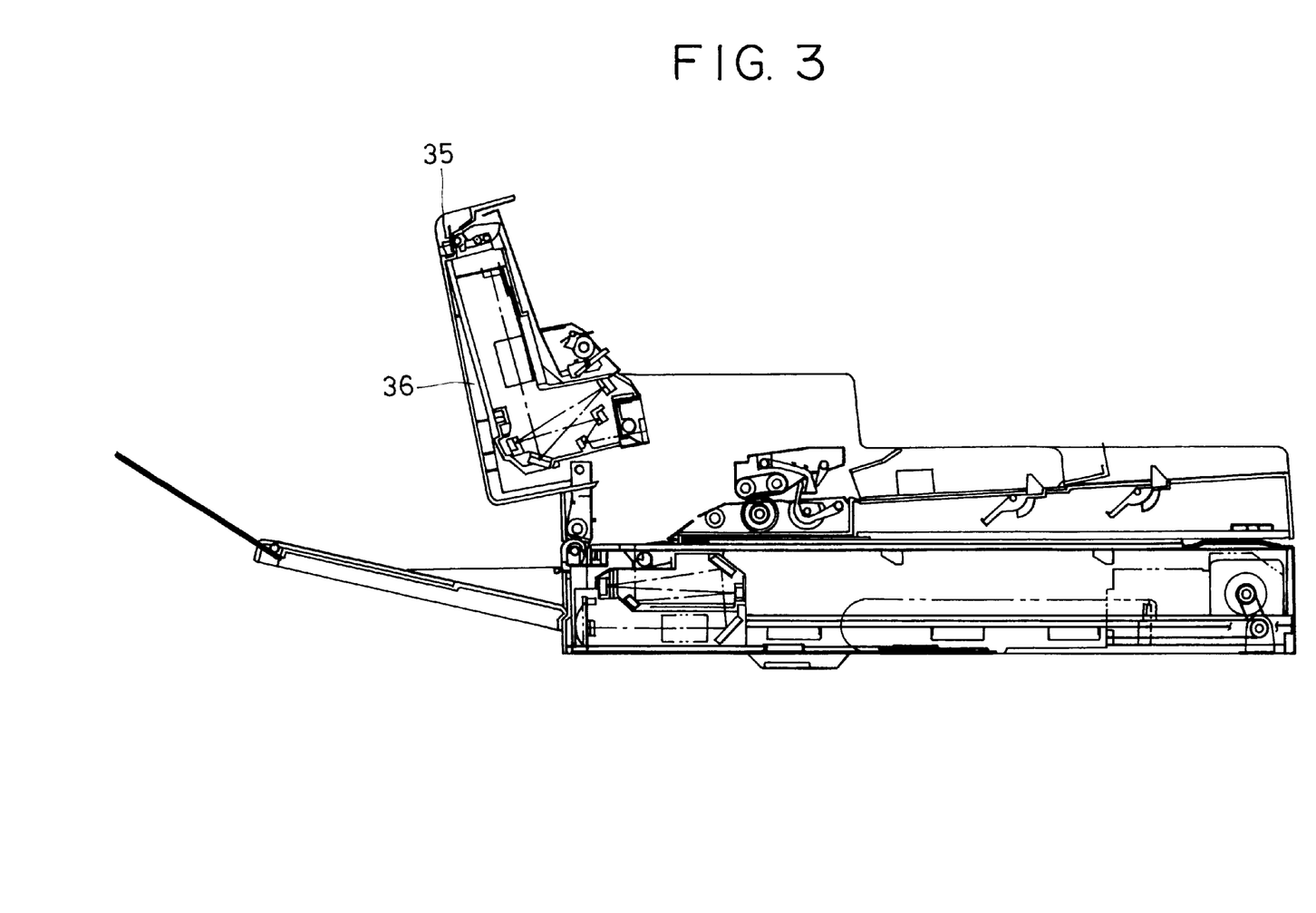
FIG. 3 is a view showing a jam correction operation in the image reader of the first embodiment of the present invention.

FIG. 3 shows the ADF 2 in a state thereof opened for a jam correction process. There are shown a jam correction lever 35 and an ADF closing unit 36 which may be opened for removing an original document jammed within.

Figure 4:
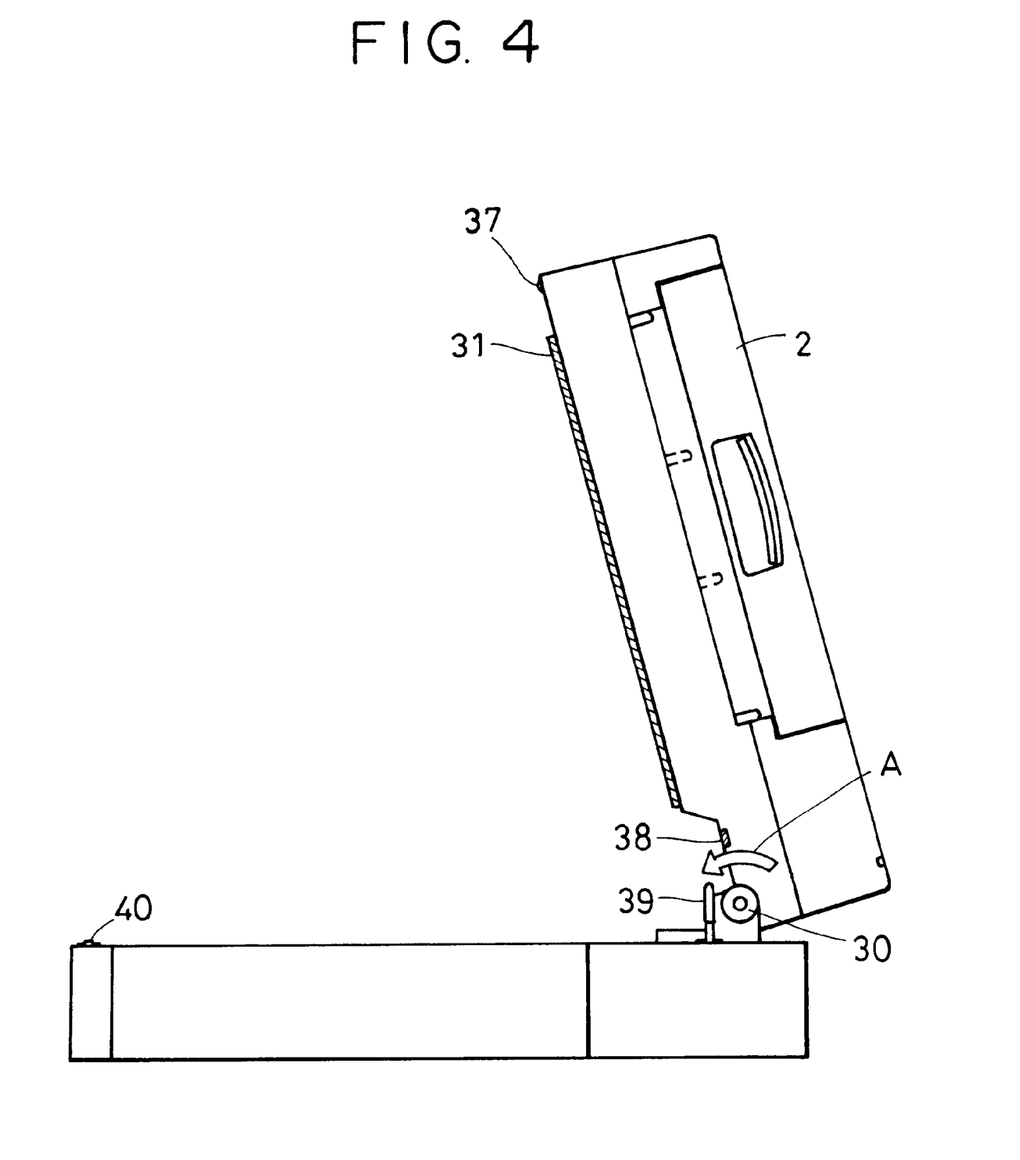
FIG. 4 is a sectional view of the image reader of the first embodiment of the present invention.
Figure 5A:
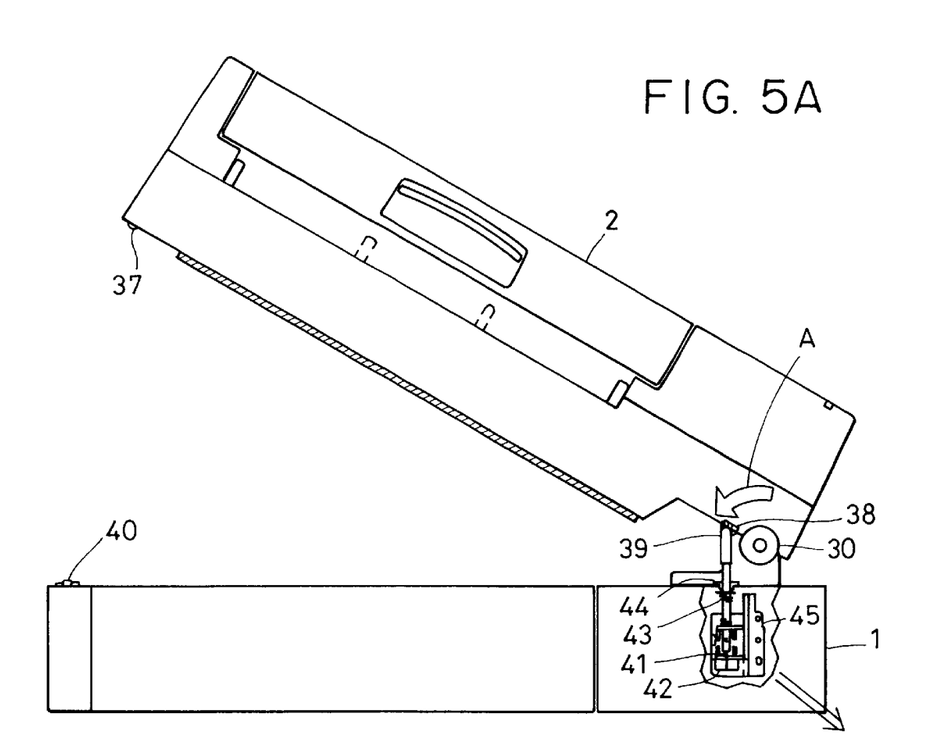
FIG. 5A is a view showing the image reader with an automatic document feeder (ADF) at a predetermined angle.
Figure 5B:
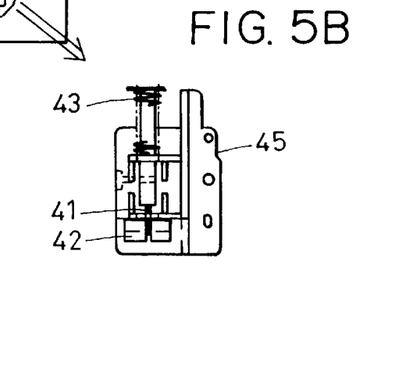
FIG. 5B is an enlarged view showing details of a closed-state detector used in the image reader.
Figure 6:
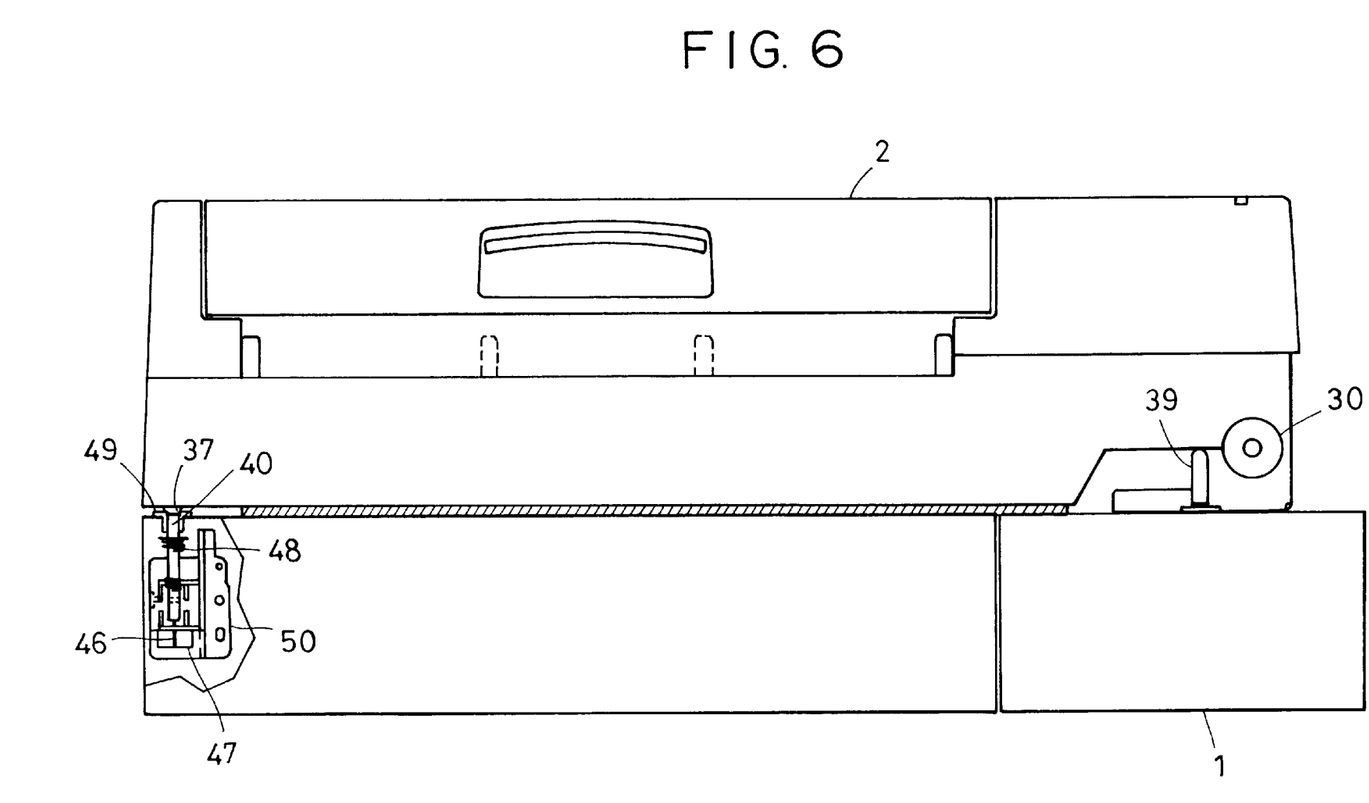
FIG. 6 shows the image reader with the ADF fully closed.

The detection of the closing and opening of the ADF closing unit 2 is now discussed, referring to FIG. 4 through FIG. 6. FIG. 4 shows the ADF 2 in the opened state thereof viewed from the direction of an arrow B in FIG. 2. In this state, the first and second operative members 37 and 38 are respectively opened from the first and second closed-state detectors 40 and 39.

As shown in FIG. 5A, the ADF 2 is pivoted in the direction of an arrow A toward the closed state thereof by a predetermined angle. The second operative member 38 is put into contact with the second closed-state detector 39, thereby pressing the second closed-state detector 39 by a predetermined stroke.

The second closed-state detector 39 has a plug 41 (a photointerruptor) at the end thereof. Referring to FIG. 5B, there are shown a photointerruptor-type sensor 42 having a photoemitter and a photodetector, a spring 43, a bearing 44, and a guide bracket 45.

As shown in FIG. 5A and FIG. 5B, the plug 41 moves in operative association with the opening and closing of the ADF 2, entering into the gap between the photoemitter and the photodetector of the sensor 42 and thereby blocking a light beam from the photoemitter. The sensor 42 thus detects that the ADF 2 is closed to a predetermined angle.

FIG. 6 shows the ADF 2 that is fully closed after being pivoted further in the direction of the arrow A.

The operative member 37 is put into contact with the closed-state detector 40, thereby lowering the closed-state detector 40 by a predetermined stroke.

The closed-state detector 40 has, on the end thereof, a plug 46 (a photointerruptor). Referring to FIG. 6, there are shown a photointerruptor-type sensor 47 having a photoemitter and a photodetector, a spring 48, a bearing 49 for the closed-state detector 40, and a guide bracket 50. As shown in FIG. 6, the closed-state detector 40 detects that the ADF 2 is fully closed when the plug 46 blocks a light beam in the sensor 47.

Referring to FIG. 1, the closed-state detectors (the second closed-state detector 39, the second operative member 38, the closed-state detector 40, and the operative member 37) are respectively arranged in the vicinities of the ends of the first reading point 25 and the second image reading point 27. Specifically, the second operative member 38 (the second closed-state detector 39), the second image reading point 27 (the first reading point 25), and the operative member 37 (the closed-state detector 40) are generally aligned in a line. In the first embodiment, the closed-state detectors are arranged on the FB 1, and the operative members are arranged on the ADF 2. Alternatively, the closed-state detectors may be arranged on the ADF 2 and the operative members may be arranged on the FB 1.

The present invention thus includes the photointerruptor-type sensors 42 and 47, each having the photoemitter and the photodetector, and the plugs 41 and 46. The present invention thus provides more flexibility in the configuration of the image reader than the conventional closed-state detector using magnets. The accuracy of the detection of the closing position of the ADF 2 is increased by narrowing the detection range of the photointerruptor through the adjustment of the stroke of the photointerruptor.

The detector itself is set to be small in size, compared with the magnet.

The detector of the present invention is subject to no particular limitation on the mounting location thereof, for instance, it is free from the limitation of the magnet that a floppy disk must be kept away from the magnet.

Since the detector employing the optical sensors achieves noncontact detection, the detector is free from wear, damage, and clicking sounds arising from the knocking of the magnets in the conventional detection method using the magnets.

When the plug 41 light-blocks the sensor 42 in operative association with the opening and closing of the ADF 2, the detector detects that the ADF 2 reaches a predetermined angle. The closing unit is thus detected at any opening angle. Any opening angle may be determined by the projection of the plug 41.

In the first embodiment, the fully-closed state of the ADF 2 is detected by the first closed-state detector 40, and the midway position between the fully-opened state and the fully-closed state of the ADF 2 is detected by the second closed-state detector 39. When the second closed-state detector 39 detects the midway position, the detection of the original document size and the advance supply of a sheet for a copying operation may be performed. A fast printout operation is thus carried out.

The detectors are small in size and provide more flexibility in the layout thereof. The detectors are generally aligned in a line in the vicinities of the ends of the first and second image reading points 25 and 27. The gap between the FB 1 and the ADF 2 is thus accurately detected in the vicinity of the image reading points. When the original document is read while being conveyed through the image reader, a stable document conveyance is achieved. A high-quality image reader thus results.

Second Embodiment

Figure 7:
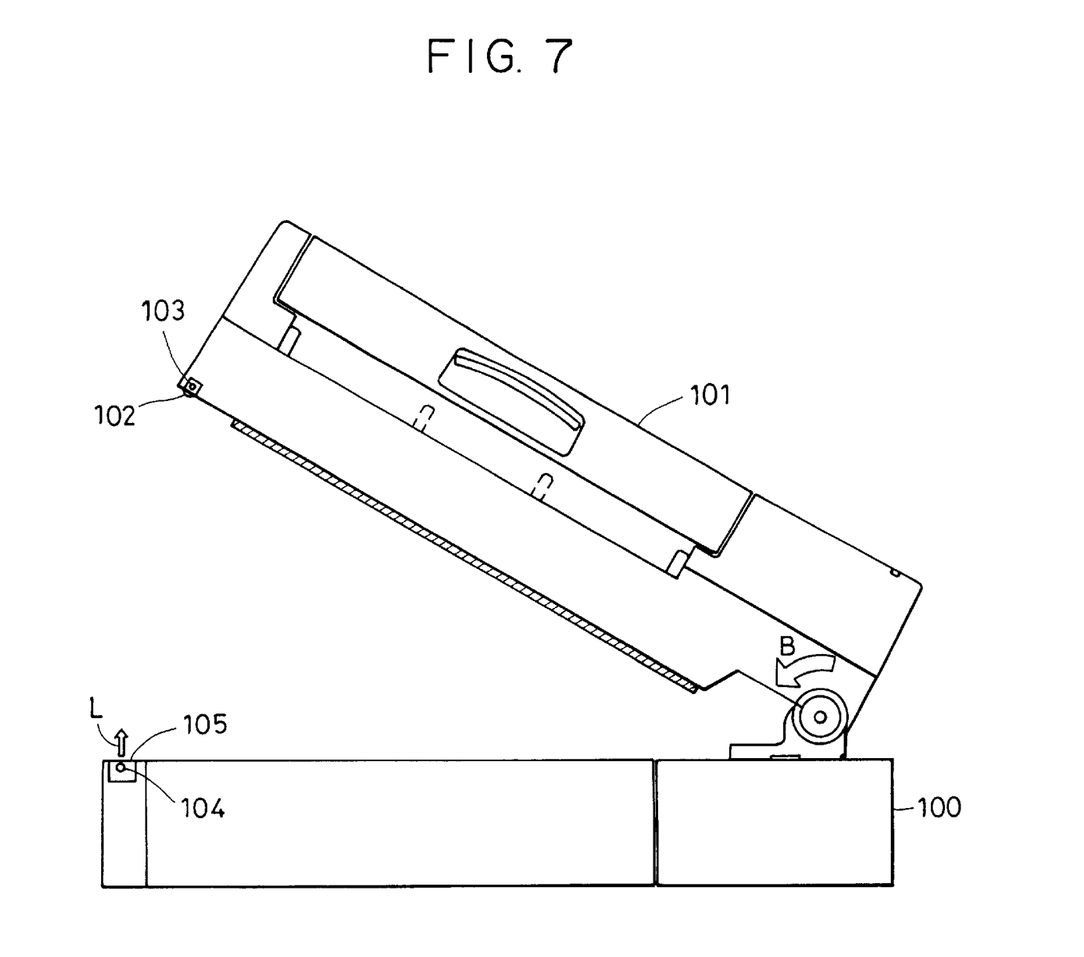
FIG. 7 is a sectional view generally showing an image reader of a second embodiment of the present invention.

FIG. 7 shows a second embodiment of the present invention. In contrast to the first embodiment of the present invention, the photoemitter 105 of a closed-state detector is arranged on a flat-bed image reader 100 and the photodetector 102 of the closed-state detector is arranged on an automatic document feeder 101.

The flat-bed image reader (FB) 100 reads the image of an original document placed thereon, and the automatic document feeder (ADF) 101 is arranged on the FB 100. FIG. 7 shows the ADF 101 in the opened state thereof.

The photodetector 102 of the closed-state detector 3 is arranged on the ADF 101. The photodetector 102 has a hole, and contains a photosensor 103 at the inside bottom of the hole. The photosensor 103 detects a light ray incident into the hole.

The photoemitter 105 of the closed-state detector is arranged on the FB 100. The photoemitter 105 has a photoemitter element 104 for emitting a light ray L.

When the ADF 101 is opened, the light ray emitted from the photoemitter element 104 of the photoemitter 105 is not detected by the photosensor 103 of the photodetector 102. When the ADF 101 is pivoted in the direction of an arrow B to a fully-closed state, the light ray emitted from the photoemitter element 104 of the photoemitter 105 is detected by the photosensor 103 of the photodetector 102. The fully-closed state of the ADF 101 is thus detected.

The diameter of the hole of the photodetector 102 is reduced, and the depth of the hole is increased. With this arrangement, the light beam from the photoemitter element 104 is not detected if the angle of the light beam from the photoemitter element 104 of the photoemitter 105 fails to coincide with the angle of the hole of the photodetector 102. The accuracy level of detection is thus adjusted by the aperture of the hole.

The second embodiment achieves the same object of the first embodiment using the same optical sensor as the closed-state detector, but dispenses with the sensor plug and guide used in the first embodiment. The component count is reduced, thereby leading to the ease of assembly and cost reduction.

In the second embodiment, the closed-state detector is mounted in the same position as that of the first closed-state detector in the first embodiment. A closed-state detector may be mounted in the same position as that of the second closed-state detector in the first embodiment.

Third Embodiment

Figure 8:
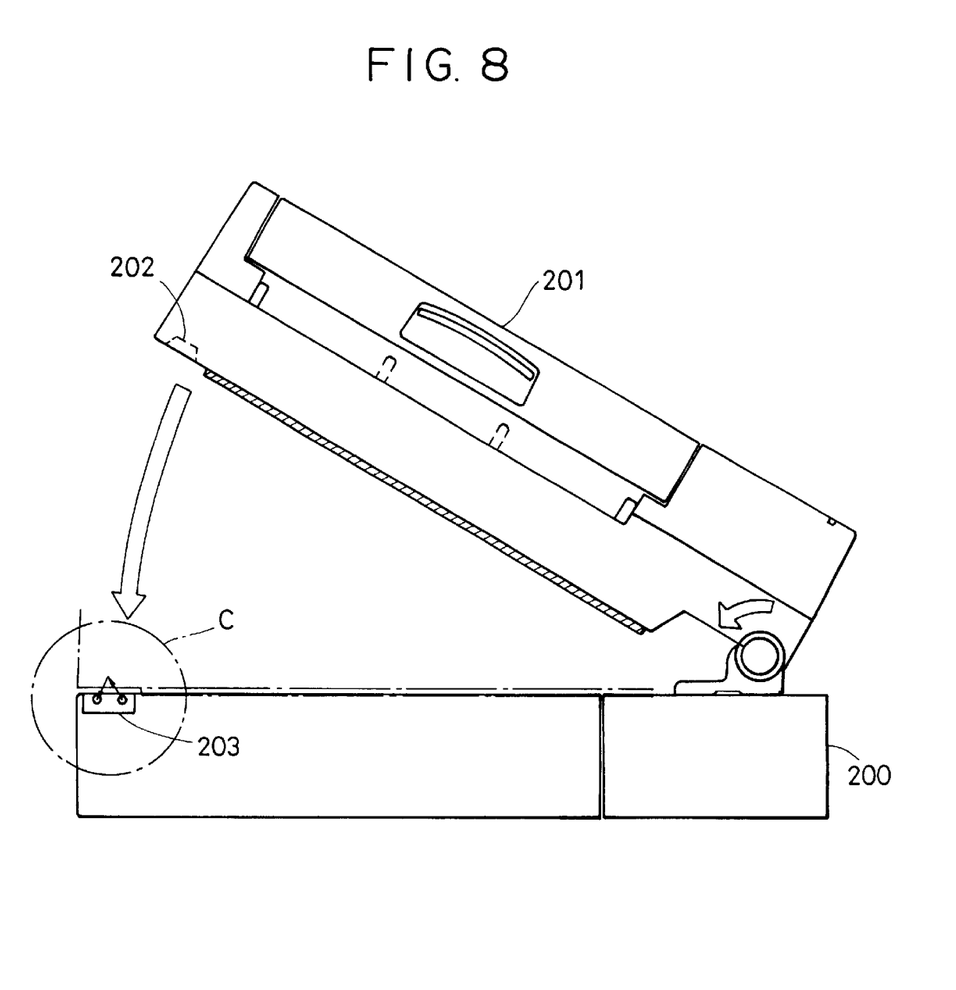
FIG. 8 shows an image reader of a third embodiment of the present invention.
Figure 9:
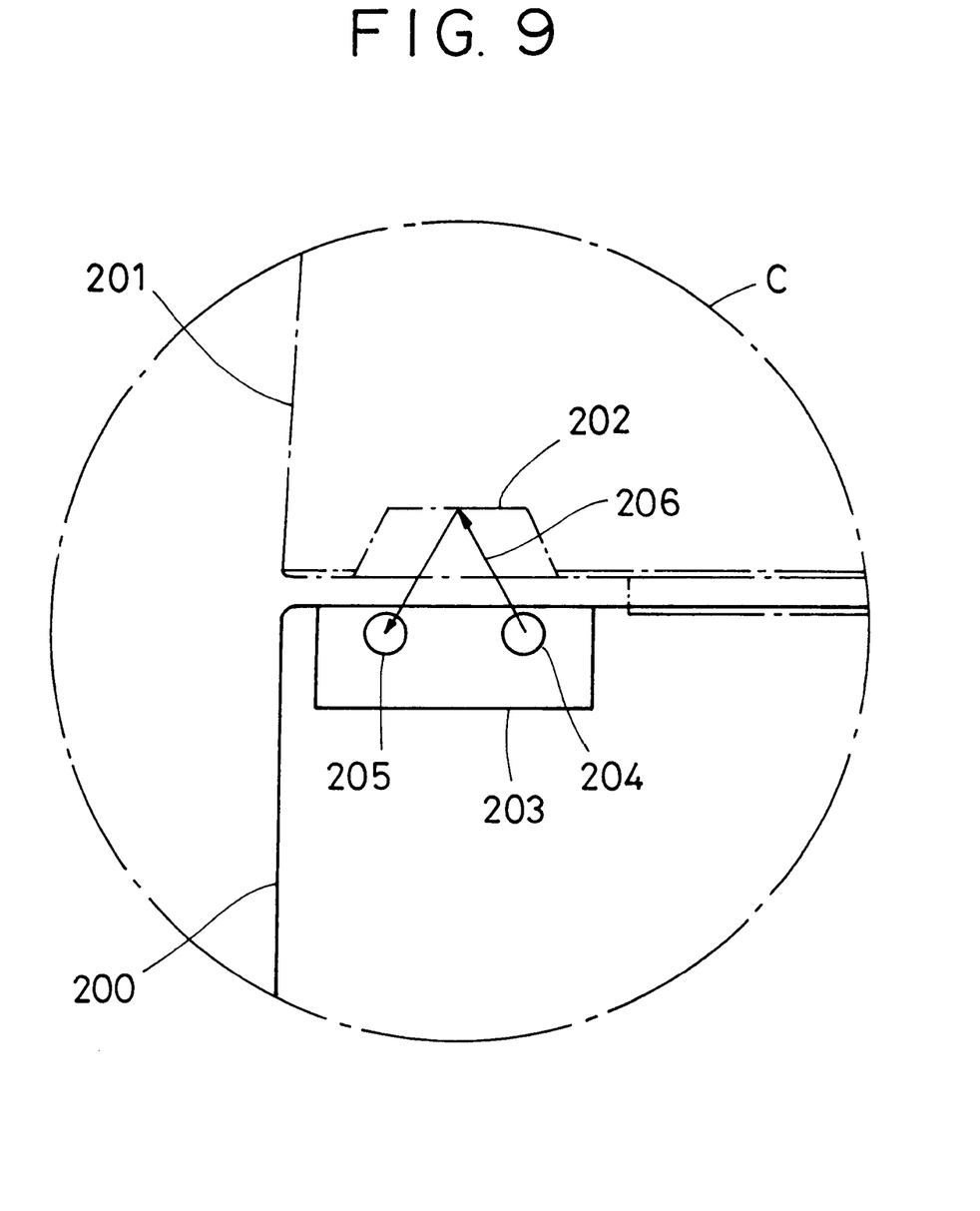
FIG. 9 is an enlarged sectional view showing a portion C in FIG. 8.

FIG. 8 and FIG. 9 show a third embodiment. In contrast to the second embodiment, the third embodiment includes the photoemitter and the photodetector of a closed-state detector on a flat-bed image reader 200 and a reflector arranged on an automatic document feeder 201 for reflecting a light beam from the photoemitter.

The flat-bed image reader (FB) 200 reads the image of an original document placed thereon, and the automatic document feeder (ADF) 201 is arranged on the FB 100. FIG. 8 shows the ADF 201 in the opened state thereof. The reflector 202 arranged on the ADF 201 is substantially concave. A photoreflective-type sensor 203 as the closed-state detector is arranged on the FB 200.

The portion C circled by a dot-dash chain line is enlarged in FIG. 9. FIG. 9 shows the ADF 201 in the closed-state thereof.

The photoreflective-type sensor 203 includes a photoemitter 204, and a photodetector 205. A light ray 206 emitted by the photoemitter 204 is reflected from the reflector 202, and the photodetector 205 receives the reflected light ray.

If the distance between the reflector 202 and the sensor 203 is not a predetermined value in this detection method, the reflected light ray is not received and the opening and closing of the ADF 201 is not detected. In other words, an accurate detection of the opening and closing of the ADF 201 is performed.

Since the photoreflective-type sensor 203 is set to focus on the reflector 202, the focusing of the photoreflective-type sensor 203 is unsuccessful if some object happens to be placed onto the FB 200. An erroneous detection is thus avoided.

Although the third embodiment has the one sensor rather than the two sensors employed in the second embodiment, the third embodiment still provides the same advantage as those of the second embodiment. The component count is reduced, thereby leading to the ease of assembly and cost reduction.

In the third embodiment, the closed-state detector is mounted in the same position as that of the first closed-state detector in the first embodiment. The closed-state detector may be mounted in the same position as that of the second closed-state detector in the first embodiment. The closed-state detector may be mounted on the ADF 201 and the reflector may be mounted on the FB 200.

Figure 10:
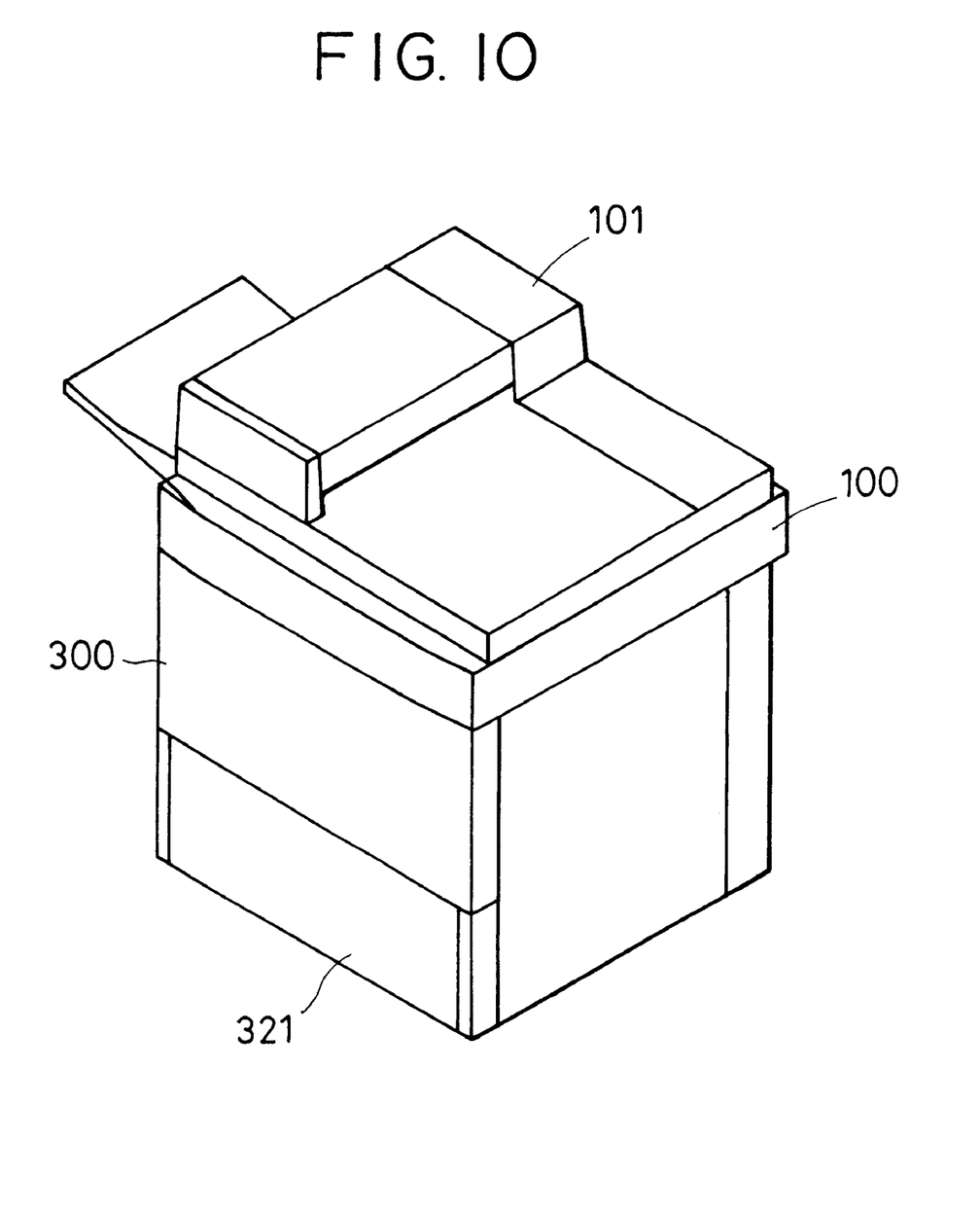
FIG. 10 is an external perspective view showing an image forming apparatus incorporating the image reader.
Figure 11:
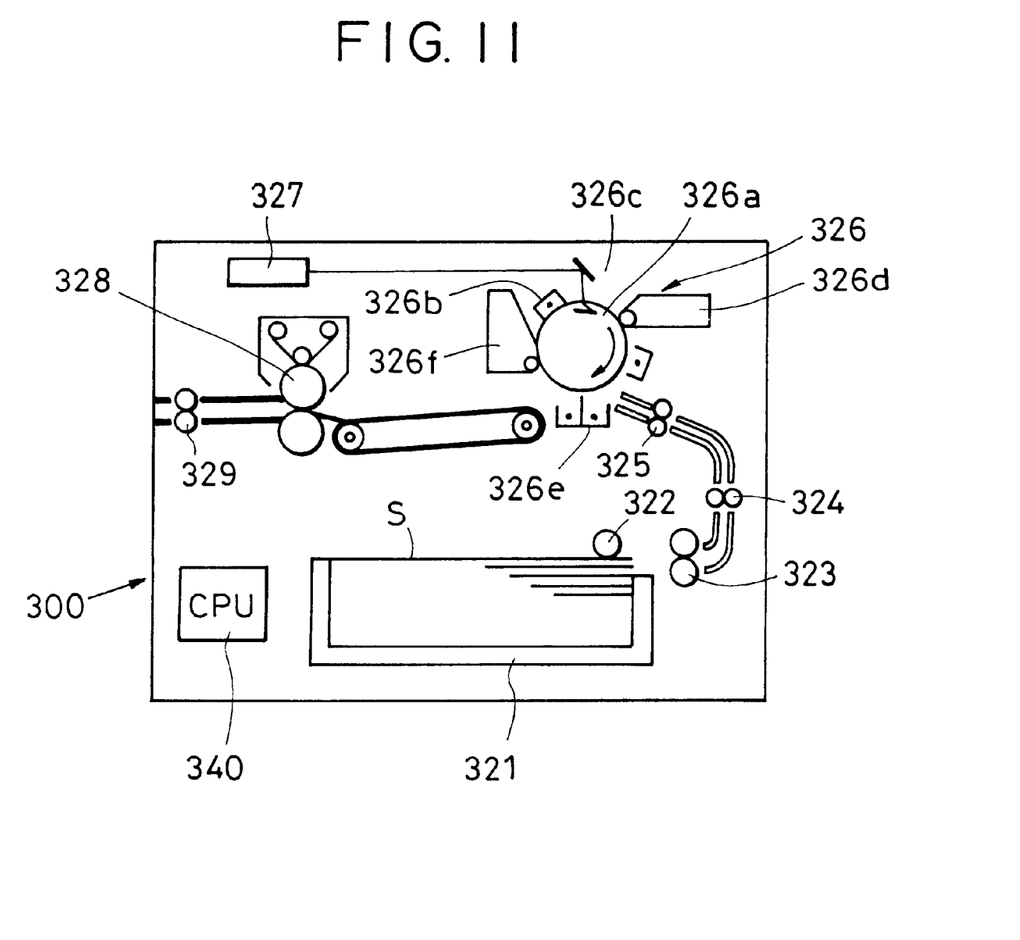
FIG. 11 is a sectional view showing the image forming apparatus.

An image forming apparatus 300 incorporating one of the image readers thus constructed is now discussed, referring to FIG. 10 and FIG. 11.

The image forming apparatus 300 includes the FB 100 and the ADF 101 of the image reader. The image information read by the image reader is transferred to a control unit (CPU) 340 arranged in the image forming apparatus 300 through a information transmission unit (not shown). Based on the image information, an image forming process is performed.

A sheet S stacked in a sheet cassette 321 is fed by a pickup roller 322, separated through separating rollers 323, transported through conveyance rollers 324, and adjusted by timing rollers 325 for timing. The sheet S is then conveyed to an image forming section 326. The image is then transferred to the sheet S by a transfer unit 326e, and is fixed onto the sheet S by a fixing unit 328, and then discharged by discharge rollers 329.

The image forming section includes, disposed around a photoconductive drum 326a, a primary charger 326b, a development unit 326d, a cleaning unit 326f, and the like. An exposure unit 327 exposes the photoconductive drum 326a to light reflected by mirror 326c, thereby forming a latent image on the photoconductive drum 326a.

As discussed above, the closed-state detector includes the photoemitter, the photodetector, and the photointerruptor which changes the quantity of light incident on the photodetector in operative association with the opening and closing of the closing unit. By narrowing the detection range, the detection accuracy of the closed position of the closing unit is set to be high, compared with the conventional closed-state detector using the magnets.

The closed-state detectors of the above embodiments simplify the construction of the image reader, and reduce the component count, while increasing the accuracy in the detection of the closed position of the closing unit.

The closed-state detector is small in size, compared with the conventional detection method using magnets, and is free from the limitation of the magnets that a floppy disk must be kept away from the magnets.

Since the detector employing the optical sensors achieves noncontact detection, the detector is free from wear, damage, and clicking sounds arising from the knocking of the magnets in the conventional detection method using the magnets.

The detectors are generally aligned in a line perpendicular to the direction of conveyance, in the vicinities of the ends of the first and second image reading points. The gap between the flat-bed image reader and the automatic document feeder is thus accurately detected in the vicinity of the image reading points. When the original document is read while being conveyed through the image reader, a stable document conveyance is achieved. A high-quality image reader thus results.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

an image-reader including:

first image-reader means, mounted on a body of an image reader, for reading image information of an original document on a first image-reader section;

a closing unit, which is openably supported on said body of said image reader by closing means;

second image-reader means, mounted on said closing unit, for reading image information of the original document on a second image-reader section; and closed-state detector means for detecting a closed state of said closing unit, wherein said closed-state detector means includes photoemitter means, photodetector means, and light-blocking means, which blocks a light ray traveling from said photoemitter means to said photodetector means, by moving in operative association with opening and closing operations of said closing unit, wherein said closed-state detector means is arranged on one of said body of said image reader and said closing unit, wherein, with said closing unit in a closed state, said closed-state detector means is arranged in an area external to one of said first image-reader section and said second image-reader section, wherein said closed-state detector means is arranged at two locations, namely, in a first area between said closing means and one of said first image-reader section and said second image-reader section, and in a second area opposed to said closing means with respect to one of said first image-reader section and said second image-reader section, wherein said closed-state detector means arranged in said first area, one of said first image-reader section and said second image-reader section, and said closed-state detector means arranged in said second area are generally aligned in a line, wherein said closed-state detector means arranged in said second area detects a state of said closing unit prior to being in the fully-closed state, and wherein said closed-state detector means arranged in said second area detects a fully-closed state of said closing unit;

image forming means for forming an image onto a sheet based on the image information read by said image reader;

sheet size detection means for detecting a sheet size; and sheet conveyance means for conveying the sheet toward said image forming means, wherein one of a detection operation for detecting a size of the original document by said sheet size detection means and a conveyance operation by said sheet conveyance means is started when said closed-state detector means arranged in said first area detects the closed state of said closing unit.

* * * * *

UNITED STATES PATENT AND TRADEMARK OFFICE
CERTIFICATE OF CORRECTION

PATENT NO. : 6,534,761 B2
DATED : March 18, 2003
INVENTOR(S) : Masayoshi Fukatsu et al.

It is certified that error appears in the above-identified patent and that said Letters Patent is hereby corrected as shown below:

Column 1,
Line 25, "that" should be deleted.

Column 7,
Line 41, "an" should read -- said --.

Column 8,
Line 30, "second" should read -- first --.

Signed and Sealed this

Eleventh Day of November, 2003

JAMES E. ROGAN
*Director of the United States Patent and Trademark Office*